O. JOHNSON.
MEANS FOR CONTROLLING ELECTRICALLY PROPELLED VEHICLES.
APPLICATION FILED JAN. 27, 1913.
1,207,295.
Patented Dec. 5, 1916.
4 SHEETS—SHEET 1.
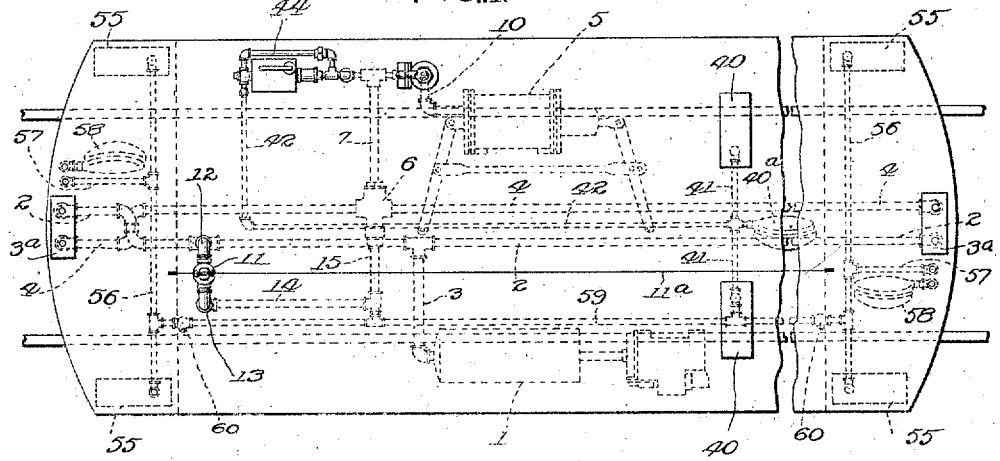
Witnesses:
J. C. Derick
George L. Chindahl
Inventor:
Oscar Johnson
By Luther L. Miller
Atty.

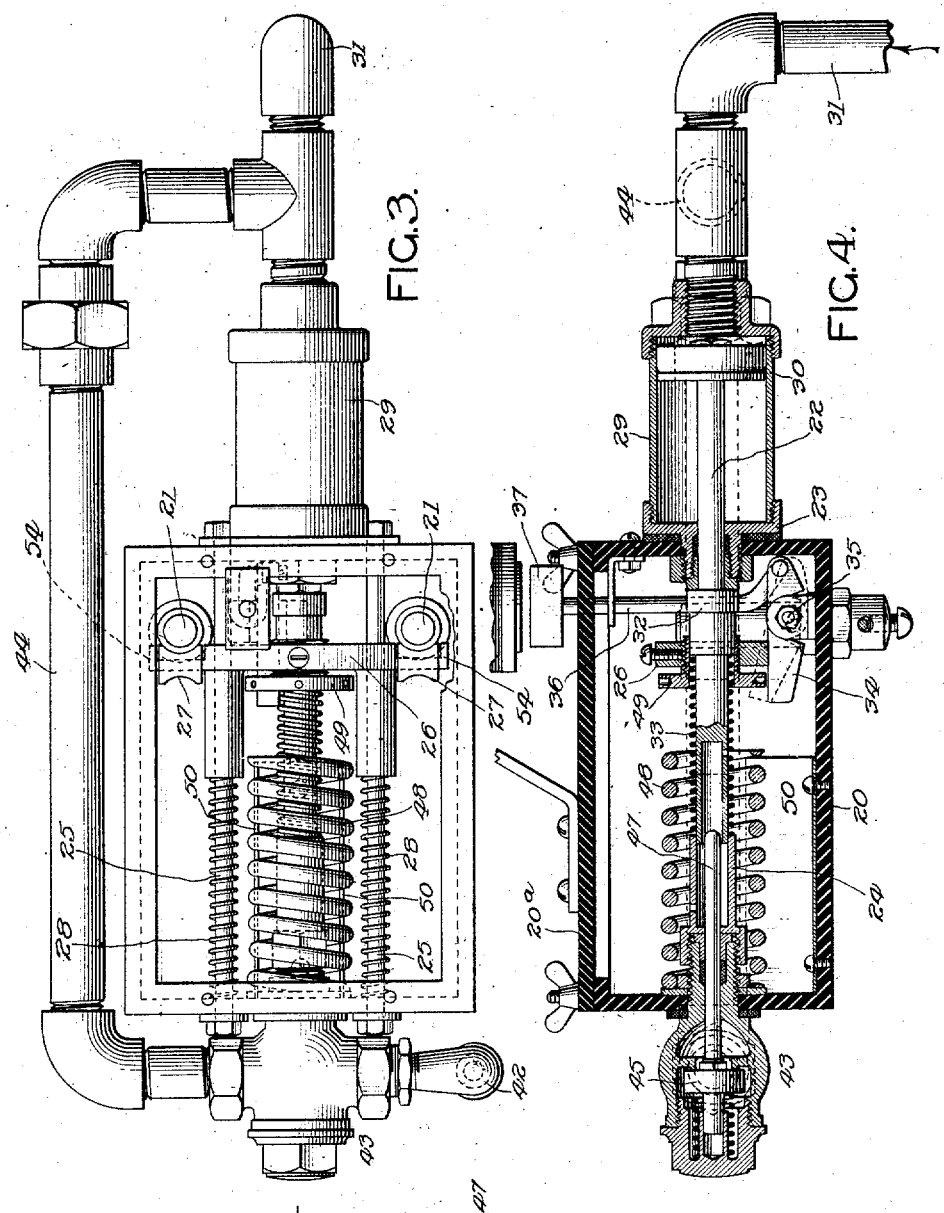

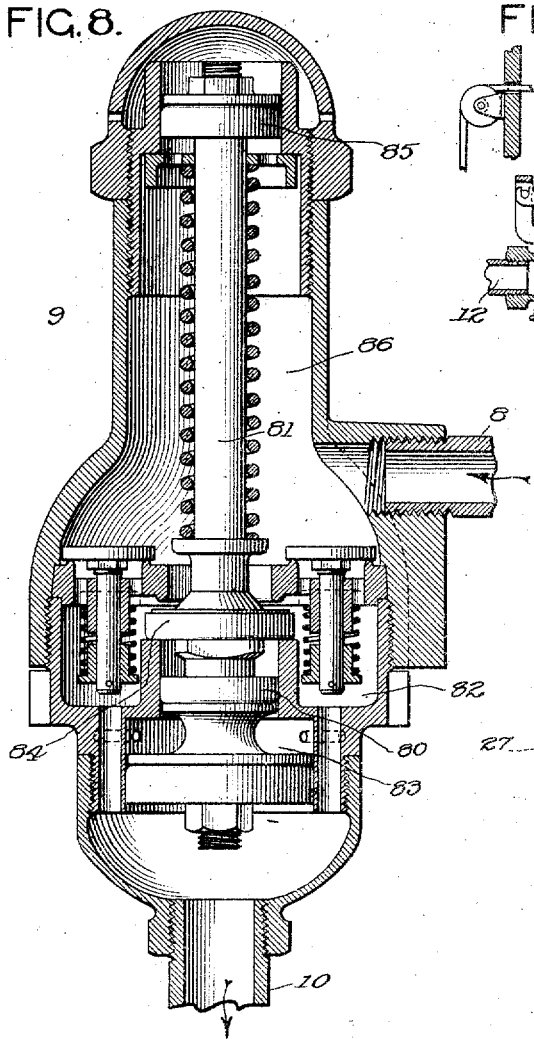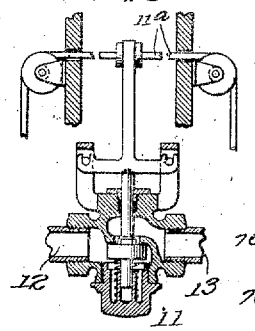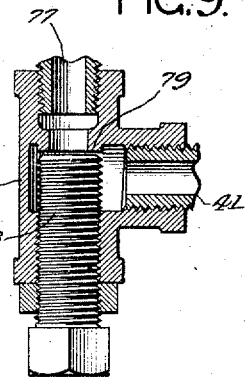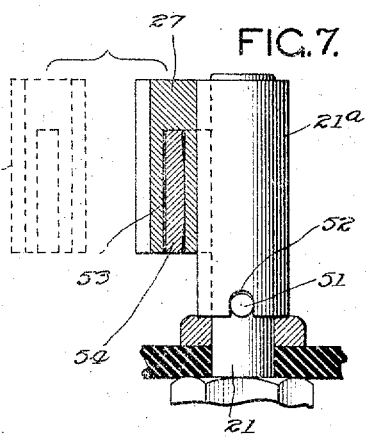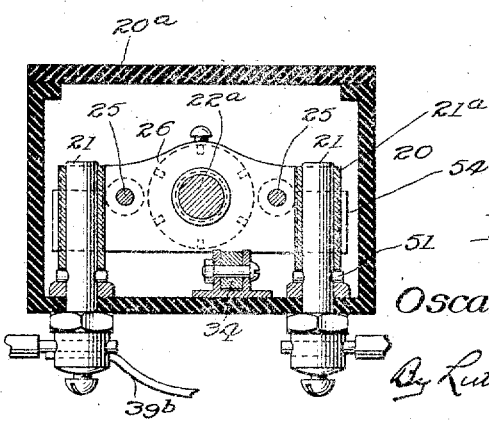

O. JOHNSON.
MEANS FOR CONTROLLING ELECTRICALLY PROPELLED VEHICLES.
APPLICATION FILED JAN. 27, 1913.
1,207,295.
Patented Dec. 5, 1916.
4 SHEETS—SHEET 4.
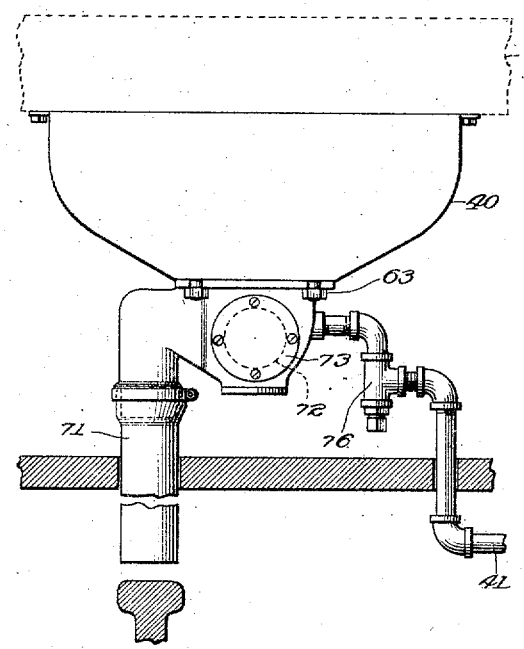
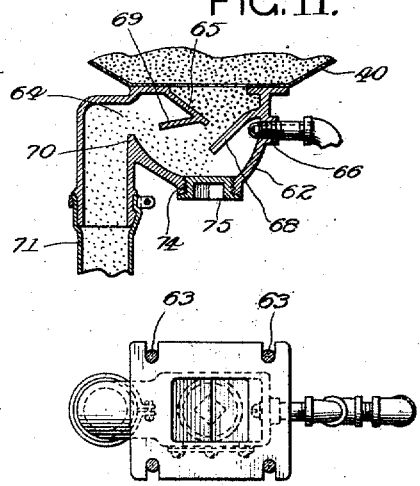
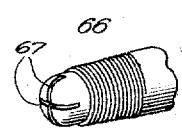
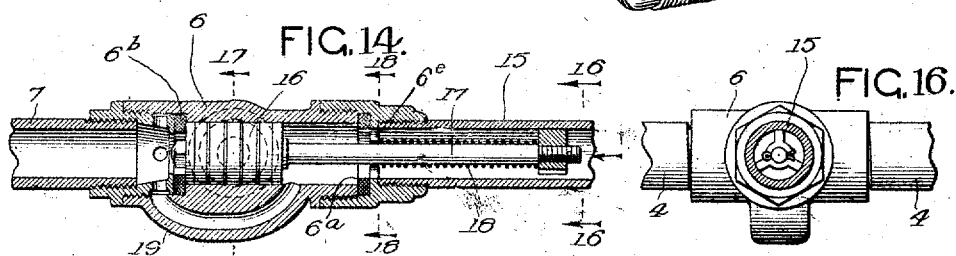
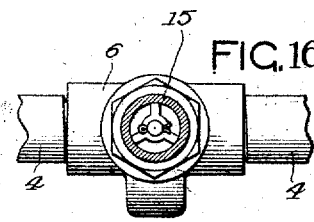
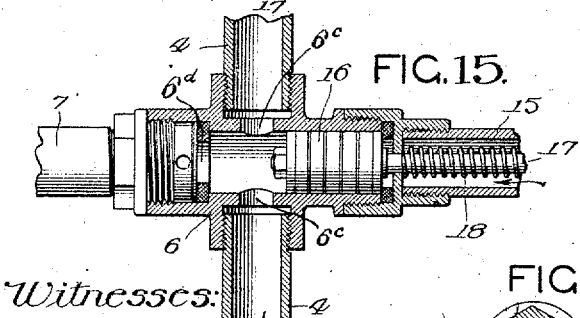
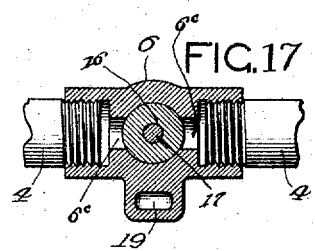
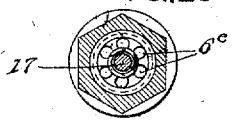
Inventor:
Oscar Johnson

UNITED STATES PATENT OFFICE.

OSCAR JOHNSON, OF CHICAGO, ILLINOIS.

MEANS FOR CONTROLLING ELECTRICALLY-PROPELLED VEHICLES.

1,207,295.  Specification of Letters Patent.  Patented Dec. 5, 1916.

Application filed January 27, 1913. Serial No. 744,304.

*To all whom it may concern:*

Be it known that I, OSCAR JOHNSON, a citizen of the United States, residing at Chicago, in the county of Cook and State of Illinois, have invented certain new and useful Improvements in Means for Controlling Electrically - Propelled Vehicles, of which the following is a specification.

This invention has particular reference to electrically-propelled street and interurban cars, and one of its principal objects, generally stated, is to improve the means for making what are termed emergency stops.

One of the objects of the invention is to provide auxiliary means whereby the conductor or any passenger can stop the car in case of sudden death or disability of the motorman, or in the event that the motorman fails to observe the necessity for stopping the car.

Another object of the invention is to provide means whereby the motor circuit is automatically opened whenever the motorman operates the motorman's brake valve to apply the brakes, and whenever the conductor or a passenger operates the auxiliary controlling means.

A further object is to provide means for automatically depositing sand upon the rails whenever the motorman makes an emergency application of the air brakes, and whenever the auxiliary controlling means is operated.

A further object is to provide means for operating the emergency circuit-breaker to close the circuit.

In the accompanying drawings, Figure 1 is a diagram, in the nature of a plan view, illustrating an apparatus embodying the features of my invention. Fig. 2 is a view of the emergency circuit-breaker and a pressure-reducing valve which is associated with the brake cylinder. Fig. 2ª is a view illustrating the location of certain track-sanding apparatus. Fig. 3 is a top plan view of the circuit-breaker, with portions omitted. Fig. 4 is a vertical sectional view taken in the plane of dotted line 4 of Fig. 3. Fig. 5 is a sectional view of a valve associated with the circuit-breaker. Fig. 6 is a transverse vertical sectional view of the circuit-breaker. Fig. 7 is a view, on an enlarged scale, of the contacts of the circuit-breaker. Fig. 8 is a longitudinal central sectional view of the pressure-reducing valve before referred to. Fig. 8ª is a view illustrating a valve comprised in the auxiliary controlling means. Fig. 9 is a sectional view of the adjustable inlet for the air nozzle used in connection with the sand traps. Fig. 10 is a view of the sand box, sand trap and pipe connections. Fig. 11 is a fragmental sectional view illustrating the construction and operation of the trap. Fig. 12 is a top plan view of the sand trap. Fig. 13 is a perspective view of the air nozzle. Fig. 14 is a vertical sectional view of an automatic valve comprised in the controlling system. Fig. 15 is a horizontal sectional view of said valve. Fig. 16 is a view taken on the dotted line 16—16 on Fig. 14. Fig. 17 is a sectional view taken on the plane of dotted line 17—17 of Fig. 14. Fig. 18 is a section on dotted line 18—18 on Fig. 14.

In Fig. 1, 1 indicates the reservoir of the air brake system, and 2 the reservoir line connected at all times to the reservoir cylinder through the pipe 3. A motorman's brake valve 3ª of any ordinary or suitable construction is located in the usual position upon each platform of the car, said valves being connected to the ends of the reservoir line 2. 4 is the train line, the ends of said train line being connected to receive air from the reservoir line through the motorman's brake valves in the usual manner. The brake cylinder is indicated at 5. The train line 4 is connected to the brake cylinder 5 through the medium of the valve casing 6 connected into the train line, a pipe 7 extending from said valve casing 6 to a pipe 8 (Fig. 2) which is connected to a pressure-reducing valve 9, said pressure-reducing valve being connected to the brake cylinder by means of the pipe 10. When the motorman operates the motorman's brake valve to admit air to the train line, air passes into the valve casing 6, thence through the pipes 7 and 8, and through the valve 9 and pipe 10 to the brake cylinder.

In order that the conductor or any passenger shall be able to apply the brakes in case the motorman has become unable to apply the brakes, or does not observe the necessity for stopping the car, I provide a conductor's valve 11 located at a suitable point, as, for example, upon the inner side of one of the bulkheads. To enable occupants of the car to open said valve, a rope 11ª may be attached to the operating lever of the valve, said rope extending to the other end of the car. The inlet side of the valve 11 is connected to the reservoir line 2, by means of a pipe 12. The outlet side of said valve 11 is connected to the valve casing 6 by means of pipes 13, 14 and 15. In the valve casing 6 is slidably mounted a valve member 16 which may be of any suitable construction, but which is herein shown as formed of a plurality of metallic and leather disks alternately arranged and secured upon the valve stem 17. Adjacent to the end of the pipe 15 is a valve seat $6^a$ against which the valve 16 seats to close the auxiliary supply ports $6^c$. Adjacent to the pipe 7 is another seat $6^b$ against which the valve 16 seats to prevent communication between the train line 4 and the pipe 7. When the valve 16 is in the position indicated in Fig. 14, the inlet ports $6^c$ and the outlet port $6^d$ are closed and flow of air from the pipe 15 to the train line 4 is prevented. A spring 18 operating upon the valve stem 17 tends to hold the valve 16 open, that is to say, in the position shown in Fig. 15. When the valve 11 is operated by the conductor or a passenger, air flows through the pipes 13, 14 and 15 and pressing against the end of the valve 16 moves said valve into the position shown in Fig. 14, thereby closing communication between the train line 4 and the pipe 7. When the valve member 16 is in this position, a by-pass 19 is opened to the entrance of air from the pipe 15, the air flowing through said by-pass into the pipe 7. It will be seen that the area of the end of the valve 16 exposed to pressure from the pipe 15 is greater than the area of the opposite end of the valve 16 exposed to pressure, whereby the pressure of the air tends to hold the valve 16 in the position shown in Fig. 14.

The air by-passed from the pipe 15 to the pipe 7 passes to the brake cylinder, and causes the brakes to be applied to the wheels.

In order that the motor circuit shall be opened simultaneously with the admission of air to the brake cylinder, I provide a circuit-breaker, which circuit-breaker may be of any suitable or preferred construction. The form herein shown comprises a casing 20 having a cover $20^a$. Attached to the casing 20 are two binding posts 21 to which the wires comprised in the motor circuit are connected. A rod 22 is supported for longitudinal reciprocating movement by means of the bearing 23 and the fixed tubular guide 24. Fixed in the casing 20 are two guide rods 25 extending parallel with the rod 22. Slidably mounted upon the guide rods 25 is a bridge 26 carrying contacts 27, the opposite sides of which are adapted for contact with contact sleeves $21^a$ on the binding posts 21. Springs 28 tend to maintain the circuit closed.

Attached to the casing 20 is a cylinder 29 within which is a piston 30 fixed upon the rod 22. One end of the cylinder 29 is connected to the pipe 7 by means of a pipe 31. On the rod 22 is an annular collar or shoulder 32. When air is admitted to the pipe 7 the piston 30 is forced in the direction to carry the collar 32 against the bridge 26 and thus move the contacts 27 away from the contacts $21^a$, thereby opening the motor circuit. A coil spring 33 interposed between the end of the guide 24 and an annular shoulder on the rod 22 serves to move the piston 30 into normal position when the air pressure is removed from said piston.

When the circuit-breaker is automatically operated as just described, it is locked in the open position until the motorman is ready to operate the controller to start the car. The means herein shown for thus locking the circuit-breaker comprises a dog 34 pivoted between its ends at 35. To one end of said dog is pivoted a stem 36 to which is attached the armature 37 for an electromagnet 38. The weight of the stem 36 and the armature 37 tends to tilt the dog into the dotted line position shown in Fig. 4.

When the bridge 26 is moved by the piston 30 until said bridge has passed the dog 34 said dog tilts into position to obstruct the return of the bridge. Any suitable means may be employed for releasing the bridge, preferably some means actuated in the rotation of the speed roll of the controller A, located on each platform. Such controller-actuated releasing means may be of any suitable character. Herein I have shown electrical releasing means, said means comprising coacting contacts in the controller A, 39 being a stationary contact finger, and $39^a$ being a contact on the speed roll. The finger 39 is connected to the portion of the power circuit including the trolley, by means of a wire $39^b$, while the contact $39^a$ is connected to one terminal of the electromagnet by means of a wire $39^c$. The other terminal of the magnet may be connected to ground, as shown. The contacts 39 and $39^a$ are so arranged in the controller that as the controller handle leaves the "off" position a circuit is closed through the electromagnet, whereupon the latter attracts the armature 37 and thereby withdraws the dog 34 from locking relation to the bridge 26. The latter is then moved into closed position by the springs 28. It will be seen that whenever the motorman's brake valve is operated, or whenever the valve 11 is operated by the conductor or a passenger, the brakes will be applied and the motor circuit opened. In order that sand may also be deposited upon the rails, I provide the means to be now described.

40 are sand boxes provided with sand traps and discharge pipes to be hereinafter described, air being supplied to said sand traps through pipes 41 and 42. The last mentioned pipe communicates with the outlet side of the valve casing 43 (Fig. 4) attached to the casing 20. The inlet side of said valve casing communicates with a pipe 44 which is connected to the pipe 31. Communication between the inlet and outlet sides of the valve casing is controlled by a valve member 45 which is normally held seated by a spring 46 and by air pressure, said valve member being attached to a valve stem 47. Said stem extends through the guide 24 into position to be engaged by the rod 22. By reference to Fig. 4, it will be seen that if the rod 22 is moved sufficiently far by the piston 30 said rod will engage the stem 47 and unseat the valve member 45, thereby opening communication between the pipe 7 and the sand traps of the boxes 40. If, as herein assumed, it is desirable to supply sand from the boxes 40 only when an emergency stop is to be made, the parts are so arranged that the movement of the piston 30 due to a service application of, say, five pounds of air pressure, will not cause the valve 45 to be unseated, said valve being unseated, however, when an emergency application of greater air pressure is had.

48 is a relatively stiff spring arranged to be engaged by an adjustable flanged member 49 having a screw-thread connection with the bridge 26. When an emergency application of air is made, the piston 30 is moved far enough to force the member 49 against the spring 48 and to bring the rod 22 into engagement with the valve stem 47, said spring being slightly compressed before the stem 47 is moved. Adjustment of the pressure at which the valve member 45 will be unseated is obtained by adjusting the member 49 to engage the spring 48 earlier or later in the movement of the rod 22. It will be seen that the sooner the member 49 strikes the spring 48 the more said spring must be compressed before the valve 45 will be unseated. The spring 48 is supported by the upper edges of two plates 50 fixed in the casing 20. If desired, a signal or alarm, such as a pneumatically-operated gong 40$^a$, may be connected to the pipe 42 so as to be actuated whenever an emergency stop is being made.

As hereinbefore stated, the binding-post contacts are in the form of cylindrical or tubular sleeves 21$^a$, said sleeves being removable from the posts 21. They are held in position by means of pins 51 engaging within recesses 52, in the lower edges of the sleeves. In case the sleeves become carbonized or otherwise damaged, they may be lifted off, turned half-way around, and replaced, a new contact surface being thus provided. The bridge contacts 27 likewise are removable and reversible. Each of said contacts has a slot 53 by means of which it is supported on a lug 54 on the end of the bridge. In order that the contact 27 may be free to move slightly so as to fit closely against the contact 21$^a$ and thus establish good electrical communication, the side of the lug 54 adjacent to the binding post is made somewhat rounding, and a slight amount of clearance is provided between the side of the lug and the contact.

As indicated in Fig. 7, the contacts 27 are free to move laterally slightly on the lugs 54, thus enabling said contacts to adjust themselves closely to the contacts 21$^a$. When one side of the contact 27 becomes damaged through use, the contact may be lifted off the lug 54, reversed, and replaced. The casing 20 may be filled with oil or other suitable liquid to lubricate the moving parts and extinguish arcs. After a stop has been made, and it is desired to set the car in motion, the motorman turns the motorman's brake valve to full release, whereupon the air in the brake cylinder, the cylinder 29 and the train-line is exhausted in the usual manner. The springs 33 and 46 then restore the piston 30 and the valve member 45 to normal position. As soon as the controller A is operated, provided the pressure has been exhausted from the train line the contacts 39 close a circuit through the electromagnet 38, thus causing the bridge 26 to be unlocked, whereupon the springs 28 move the bridge to close the motor circuit.

As hereinbefore stated, the motor circuit is automatically opened whenever the motorman operates the motorman's brake valve to apply the brakes, the circuit being broken simultaneously with the admission of air to the brake cylinder, and therefore before the slack in the brake rigging is fully taken up. Overloading of the motor due to application of the brake shoes to the wheels before the circuit is opened is thereby rendered impossible. The motor circuit is held open by the piston 30 so long as there is pressure in the train line, even though the motorman should meanwhile release the detent 34 by operating the controller.

The numeral 55 indicates the usual sand boxes arranged beneath the platforms, the traps of the boxes at each end of the car being connected by a pipe 57 to a valve (not shown) such as the one shown in Patent No. 969,877 dated Sept. 13, 1910. 58 is a pneumatically operated gong also connected to said valve. When said valve is opened, air is supplied to ring the gong and deposit sand on the rails. The pipes 56 are connected to the pipe 15 by a pipe 59, check valves 60 being placed in the pipe 59 to prevent air from flowing from the pipes 56 to the pipe 59.

When an emergency application of air brakes is made, the wheels are likely to become locked and to slide on the rails, to obviate which it is necessary to increase the traction between the wheels and the rails by depositing sand on the latter. Heretofore it has been customary to provide sand boxes beneath each platform, only those under the front platform being operated in making a stop. When a heavy application of air was made to the brakes, the wheels of the rear truck were likely to become locked before they reached the sanded portion of the track. When so locked, the wheels push before them sufficient scale and dirt to sweep the sand off the rails, thus nullifying the sanding operation so far as the wheels of the rear truck were concerned. In order that sand shall be promptly applied to the rails in front of the rear truck, I place the sand boxes 40 between the trucks, preferably midway therebetween.

Heretofore the sand boxes and traps have been located beneath the floor of the car, and thus the sand has been exposed to moisture and to freezing weather, in consequence of which the sand in the traps has been liable to cake or freeze. When caked or frozen, the sand trap may fail to discharge sand, or the air pressure may accumulate until the sand is discharged with such force as to scatter it over the right of way. I therefore place the sand boxes 40 and the associated traps within the car (preferably beneath a transverse seat 61 Fig. 10), where the sand will be kept dry.

Any suitable form of trap may be used in conjunction with the sand boxes 40 and 55, the construction illustrated in Figs. 11 and 12 being preferred. The body 62 of the trap is detachably secured to the sand box by means of bolts and nuts 63. The sand outlet 64 is at one side of the trap body and near the upper part thereof.

65 is a baffle to prevent sand from flowing directly from the sand box to the outlet. At the side of the trap body, opposite to the outlet 64 is an air nozzle 66. In previous forms of nozzle, the orifice has been a small substantially circular opening, from which the air emerged in the form of a fine stream. When the sand is caked, such a fine stream is apt to bore a hole through the sand, without causing the discharge of an effective amount of sand. To provide a stream of air which shall be capable of effectively discharging moist or caked sand, I form the orifice of two intersecting slits 67 or equivalent constructions affording a relatively broad or diffused air discharge. In order further to insure effective action of the air upon the sand, I provide a baffle 68 inclined downwardly in front of the nozzle 66. Contact of the air stream with the baffle 68 diffuses or breaks up said stream, said baffle also directing the air downwardly below the sand. The baffle 68 also keeps the sand away from the nozzle 66, thus preventing sand from caking upon or clogging the nozzle. A baffle 69 is provided to prevent the air from eddying or returning toward the baffle. The orifice 67 is made of such size that, in practice, the air simply lifts the sand over the barrier 70, the sand falling through the pipe 71 onto the rail under the action of gravity and without being blown through said pipe. In order to obtain a prompt and reliable discharge of the sand, the pipe 71 is made straight and is vertically disposed, as shown, thus obviating danger of choking at bends. To facilitate cleaning of the trap, an opening 72 of ample size is formed in the side of the trap body, which opening is normally closed by a plate 73. In the lower end of the trap body is a cleaning opening 74 closed by a screw plug 75.

Heretofore it has been the practice to admit the compressed air directly to the nozzle, and the latter has frequently become clogged with sand, scale and particles of iron rust. When so clogged it has been necessary to send the car to the barn, take apart the line of pipe containing the nozzle, clean the nozzle and replace the parts. It is impracticable to use a nozzle the orifice of which may be readily adjusted or enlarged in case of clogging, because experience has shown that an adjustable nozzle is a temptation to the motorman to enlarge the opening for the purpose of obtaining a greater supply of sand. Such enlargement, however, leads to rapid exhaustion of sand and compressed air, the brakes being thereby rendered ineffective. Thus when occasion arises for a quick application of the brakes to avoid an accident, the brakes fail to respond. Instead of admitting compressed air directly to the nozzle 66, I provide a special air inlet which can be readily cleaned and which is of such form and appearance as not to attract the attention of the motorman or permit of its convenient manipulation by unauthorized persons. Said inlet means comprise, in the present embodiment, a T coupling 76, the upper end or nipple of which is connected to the nozzle by means of a connection 77. Into the lower end of the T coupling 76 is turned a screw 78, the plane inner end of which is adapted to seat against an annular seat 79. The remaining arm or nipple of the T coupling 76 is connected to the pipe 41. In practice, the screw 78 is turned until its inner end is in contact with the seat 79; the screw is then unscrewed a suitable distance, say, a half turn, to create a restricted opening establishing communication between the pipes 41 and 77. It will be seen that scale and other foreign matter will find lodgment in the lower portion of the T coupling without ordinarily obstructing the air inlet space formed between the screw 78 and the seat 79. If, however, it becomes necessary to clean out the air inlet, the screw 78 may be removed, and all foreign matter blown out through the lower end of the T coupling, it being unnecessary to disconnect any of the pipes. It will be seen that the air inlet device just described does not have the appearance of a valve or an adjustable device, and, moreover, can not be adjusted without the use of a wrench. Thus it is not likely to be tampered with by the motorman.

The pressure-reducing valve 9 is substantially similar to the one disclosed in Patent No. 1,041,091, dated October 15, 1912. In the form herein shown, a cup leather 80 is provided upon the valve stem 81 to prevent leakage from the chamber 82 to the cylinder 83. To counterbalance the pressure upon the cup leather 80 when the valve member 84 is closing, I provide a piston or cup leather 85 which is exposed to the pressure in the chamber 86. The area of the piston 85 is sufficiently larger than the area of the cup leather 80 to insure tight closing of the valve member 84.

I claim as my invention:

1. The combination of a brake cylinder, a train line arranged to communicate with said brake cylinder, a source of high-pressure supply, two motorman's brake valves communicating with the opposite ends of the train line, for connecting said source to said train line, auxiliary manually actuated means for connecting said source to said brake cylinder, and means for interrupting communication between the train line and the brake cylinder when said auxiliary means is operated.

2. The combination of a brake cylinder, a train line arranged to communicate with said brake cylinder, a source of high-pressure supply, two motorman's brake valves communicating with the opposite ends of the train line, for connecting said source to said train line, another manually actuated valve controlling communication between said source and the brake cylinder, and a valve operable by pressure fluid flowing through the said manually actuated valve for interrupting communication between the train line and the brake cylinder.

3. The combination of a valve casing, a brake cylinder, a pipe connecting said valve casing to said brake cylinder, a train line connected to said valve casing, two motorman's brake valves communicating with the opposite ends of the train line, a pressure pipe also connected to said valve casing, a valve member in said casing arranged to be moved by the pressure in said pressure pipe into position to close communication between the train line and the brake-cylinder pipe, said valve casing having therein a by-pass arranged to establish communication between the pressure pipe and the brake-cylinder pipe, said valve member being arranged to close said by-pass when not in position to interrupt communication between the train line and the brake-cylinder pipe, and means independent of the motorman's brake valve for controlling the supply of pressure fluid to said pressure pipe.

4. In an electrically-propelled vehicle, the combination of an air brake, a motor-circuit breaker, track-sanding means, means for simultaneously operating said air brake, circuit-breaker and track-sanding means, and means for simultaneously operating said air brake and said circuit breaker only.

5. In an electrically-propelled vehicle, the combination of an air brake, a motor-circuit breaker, an alarm, means for simultaneously operating the same, and means for simultaneously operating said air brake and said circuit breaker only.

6. In an electrically propelled vehicle, the combination of an air brake, a circuit breaker, a track sanding device, and an alarm; means for simultaneously operating said brake, circuit breaker, sanding device and alarm; and means for simultaneously operating said brake and circuit breaker only.

7. The combination of a high pressure tank; an air brake device, a circuit breaking device, and a sanding device, each of said devices being pneumatically operable, and being operatively connected with said tank by means of conduits, said conduits being normally closed; opening means in each of said conduits, the opening means in the conduits to said brake and breaking devices being operable at a lower pressure than the opening means in said other conduit.

8. In an air-brake system, a valve casing having an inlet port, an auxiliary supply port, an outlet port, a by-pass around the outlet port, and a valve member in said casing operable to simultaneously close said inlet port and said outlet port and to open said by-pass.

9. The combination of a car, a train line and a reservoir line on and extending lengthwise of the car, a motorman's brake valve at each end of the car and each connected to both of said lines, a brake cylinder, a pipe connecting the brake cylinder to the train line, a reservoir connected to the reservoir line, a conduit connecting the reservoir line to said pipe at the junction of the train line and said pipe, and a valve for opening and closing said conduit.

10. The combination of a car, a train line and a reservoir line on and extending lengthwise of the car, a motorman's brake valve at each end of the car and each connected to both of said lines, a brake cylinder, a pipe connecting the brake cylinder to the train line, a reservoir connected to the reservoir line, a conduit connecting the reservoir line to said pipe at the junction of the train line and said pipe, a valve for opening and closing said conduit, and a valve member exposed to pressure in said conduit for interrupting communication between the train line and said pipe.

11. The combination of a car body, a train line and a reservoir line on and extending lengthwise of the car body, a motorman's brake valve at each end of the car body and each connected to both of said lines, a brake cylinder, a pipe connecting the brake cylinder to the train line, a reservoir connected to the reservoir line, a conduit connecting the reservoir line to said pipe, and a conductor's brake valve within the car body for opening and closing said conduit.

12. In an electrically-propelled vehicle, the combination of a train line, a brake cylinder, a pneumatically-actuated motor-circuit-breaker, an air conduit connecting said circuit-breaker and brake cylinder, a reducing valve in said conduit, a pipe connecting the train line to said conduit at a point between the circuit-breaker and the reducing valve and an air-controlling valve connected to the train line.

13. In an air brake system, an air line and an air pipe, a valve casing connecting said line and pipe, a valve seat surrounding the port leading to said pipe, and a valve member in said casing adapted to be seated on said seat to close the port, said valve member when in such position interrupting the flow through said line.

14. In an air brake system, an air line and an air pipe, a valve casing having a port leading to said pipe and two ports communicating with said air line, a valve seat surrounding the port leading to said pipe, and a valve member reciprocable in said valve casing, said member registering with and closing the two ports when in contact with said seat.

15. In an air brake system, an air line, a brake cylinder, a valve casing having a port connected to said line, a pipe connected to said cylinder, said casing having a port communicating with said pipe, a source of pressure fluid supply, a conduit connecting said source to said casing, and a valve member movable in said casing to close said ports.

16. In an air brake system, an air line, a brake cylinder, a valve casing having a port connected to said line, a pipe connected to said cylinder, said casing having a port communicating with said pipe, a source of pressure fluid supply, a conduit connecting said source to said casing, and a valve member movable in said casing by fluid pressure in said conduit to close said ports.

17. In an air brake system, an air line, a brake cylinder, a valve casing having a port connected to said line, a pipe connected to said cylinder, said casing having a port communicating with said pipe, a source of pressure fluid supply, a conduit connecting said source to said casing, the latter having a by-pass communicating between the conduit and the pipe, and a valve member movable in said casing to interrupt communication between the conduit and the by-pass and also movable to establish the last mentioned communication and close said ports.

18. In an air brake system, an air line, a brake cylinder, a valve casing having a port connected to said line, a pipe connected to said cylinder, said casing having a port communicating with said pipe, a source of pressure fluid supply, a conduit connecting said source to said casing, the latter having a by-pass communicating between the conduit and the pipe, and a valve member movable in said casing to interrupt communication between the conduit and the by-pass and also movable by fluid pressure in said conduit to establish the last mentioned communication and close said ports, and a spring tending to move the valve member in the direction to open said ports.

19. In an air brake system, a valve casing having two inlet ports, an auxiliary supply port, an outlet port, and a by-pass around the outlet port, and a valve member reciprocable in said casing to blank said inlet ports and close the outlet port and auxiliary supply port, the by-pass being in communication with the auxiliary supply port when the outlet port is closed.

In testimony whereof I affix my signature in the presence of two witnesses.

OSCAR JOHNSON.

Witnesses:
 EARL C. CARLSON,
 GEORGE L. CHINDAHL.